Sept. 23, 1969   W. C. RALKE ET AL   3,469,145
PROJECTOR LIGHT SOURCE
Filed July 26, 1967   2 Sheets-Sheet 1
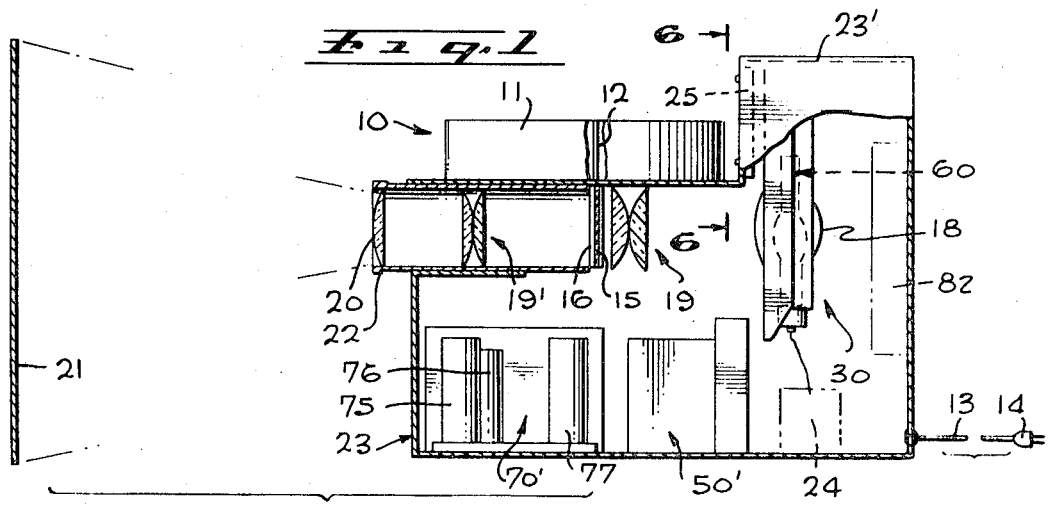
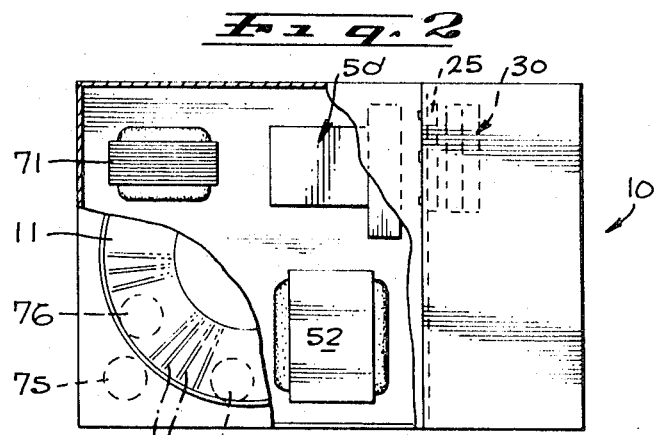
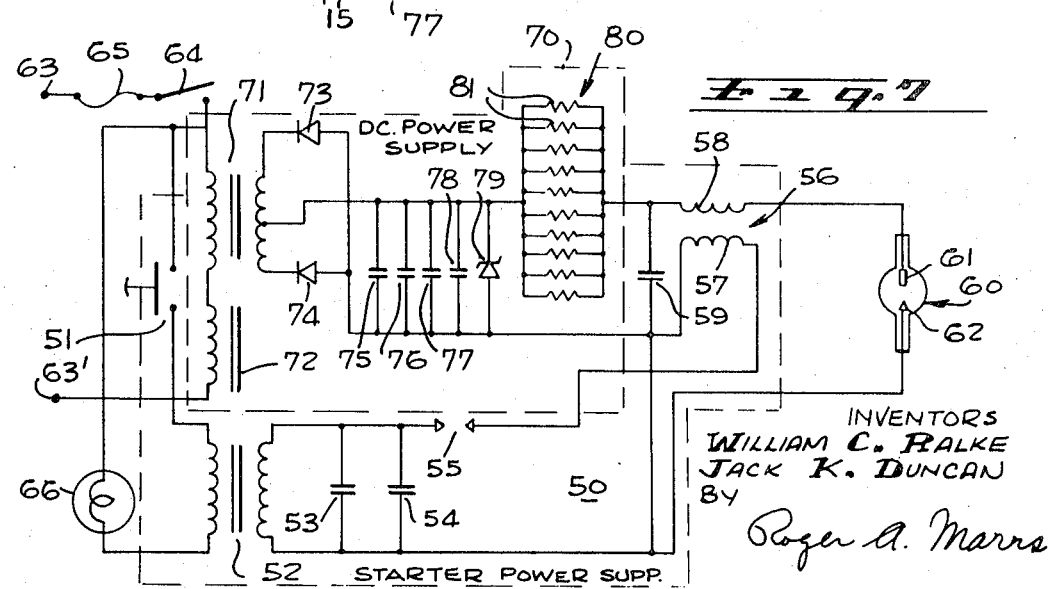
INVENTORS
WILLIAM C. RALKE
JACK K. DUNCAN
BY
Roger A. Marrs

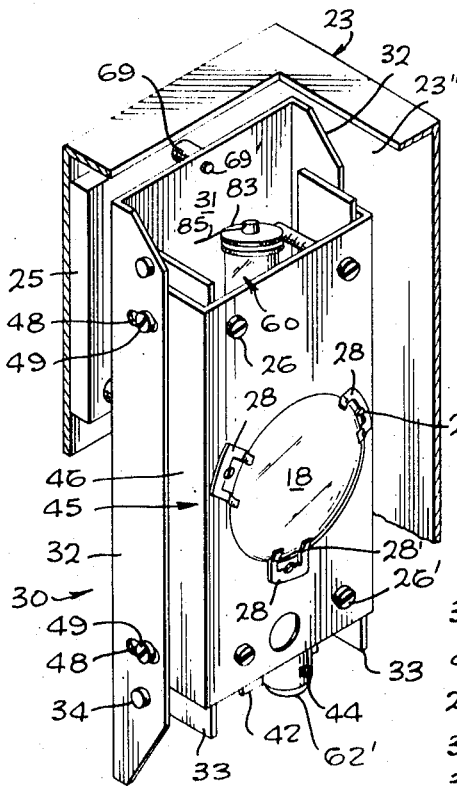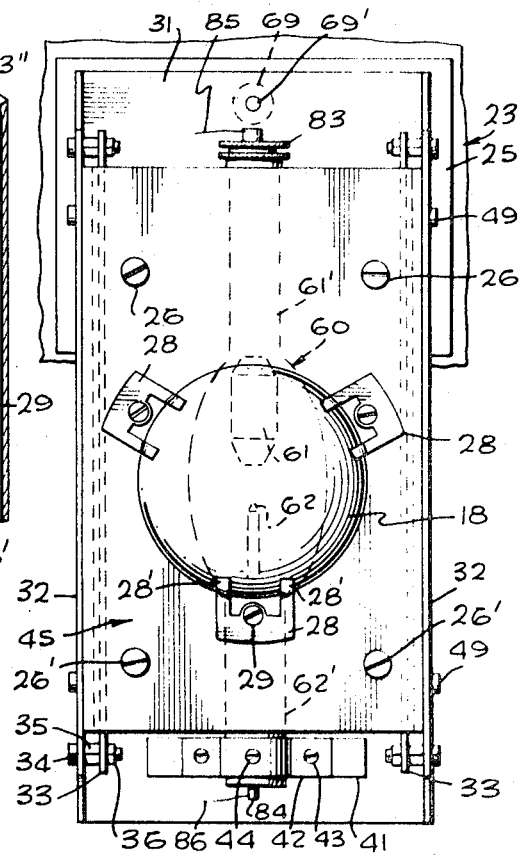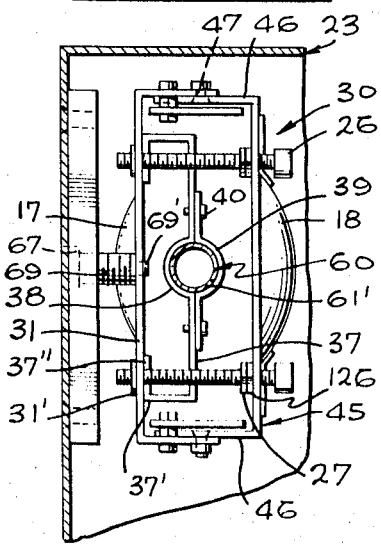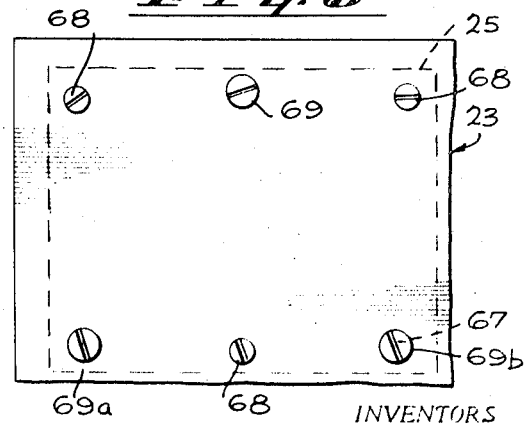

# United States Patent Office 3,469,145
Patented Sept. 23, 1969

3,469,145
PROJECTOR LIGHT SOURCE
William C. Ralke, 641 N. Highland Ave., Los Angeles,
Calif. 90036, and Jack K. Duncan, 10436 San Jose
St., Southgate, Calif. 90280
Filed July 26, 1967, Ser. No. 656,285
Int. Cl. H05b 41/14
U.S. Cl. 315—200                              18 Claims

ABSTRACT OF THE DISCLOSURE

A gaseous arc light source is disclosed herein including a replaceable lamp housing and power supply for use with a projector. The lamp housing includes a face plate having brackets for mounting thereto a xenon or mercury arc lamp. A back plate for mounting a mirror is connected in angularly adjustable, spaced apart relationship with the face plate. A mounting plate on the projector case receives the housing in a position whereby the lamp arc and mirror are aligned along the projector optical axis. A power supply mounted within the projector case provides a high voltage RF pulse to ignite the lamp, and a low voltage, high DC current to maintain the lamp lit.

BACKGROUND OF THE INVENTION

Field of the invention

This invention relates to a light source for a projector, and more particularly to a gaseous light source including a replaceable lamp housing and a self contained power supply.

Description of the prior art

Most present day 35 millimeter slide projectors utilize incandescent lamps as their light source. Typically, the 1000 watt incandescent bulbs used with such projectors have an average brightness of about 650 lumens at the screen. While this provides sufficient light for average home viewing, it is insufficient for auditorium use.

The limited light output of such conventional available projectors is a factor limiting their usefulness in industrial and sales displays. Except for this, 35 millimeter projectors, particularly those employing circular slide magazines (and available commercially, e.g., under the trade name "Carousel"), are well suited for use in such automated displays. These projectors can cycle continuously, repititiously, and/or programmatically through the use of a tray of slides, and require no operator intervention. However, the relatively low light output of these projectors means that they cannot be used in areas of high ambient light level, or for distant or large scale projection.

While projectors are available with other light sources, these prior art devices suffer various disadvantages. For example, the arc lamps common to 35 millimeter movie projectors are large in size, and require manual adjustment of their elements to ignite them, thus making them unsuitable for use in automated projection equipment intended to be operated by non-technical personnel.

Mercury and xenon arc lamps, available in metal sealed, glass packages, produce light of great intensity. Typically, a 500 watt xenon arc lamp has an average brightness of about 35,000 candlepower per square centimeter, sufficient to project a 35 millimeter slide with a brightness of 2000 screen lumens. However, in the past, such lamps have not been adapted for use in 35 millimeter projectors because of their severe power requirements, size and weight, and the difficulty of handling and replacing the lamps themselves.

Halogen arc lamps require RF pulse amplitudes on the order of 30 kilovolts to start the lamp. A current in the order of 25 amperes at 20 volts is required to maintain such a lamp lit. This places severe requirements on the lamp supply, and in the past has required the use of power supplies which were extremely bulky. Moreover, such lamps usually are under a positive internal ambient gas pressure of several atmospheres, thus presenting the risk of explosive failure if the lamps are not properly handled. Further, marks such as finger prints present on the bulb before its first usage will be burned into the quartz glass when the lamp is turned on, adversely affecting bulb clarity and light emission. These problems have made the use of high intensity xenon or mercury arc lamps in 35 millimeter projectors undesirable.

The apparatus which forms the subject matter of the present invention comprises a projector adapted to use a xenon or other halogen arc lamp. The projector is provided with a replaceable lamp housing, such that the entire housing, including the arc lamp itself, may be replaced when the bulb wears out. By utilizing such a replaceable housing, with a lamp premounted therein, many of the handling difficulties of halogen arc bulbs are eliminated. For example, the housing serves as a protective member should the bulb explode, and further, the likelihood of such failure is significantly reduced because the bulb already is appropriately mounted in the housing. Further, there is no need to touch the lamp itself during replacement, thus eliminating a source of markings or finger prints on the bulb.

The present invention also includes a novel power supply of sufficiently small size and hence, reduced weight, to fit within the project case, thus eliminating another shortcoming of the prior art.

SUMMARY OF THE INVENTION

In accordance with the present invention, a 35 millimeter slide projector is provided that obviates the difficulties and problems encountered with conventional projectors and which is adapted to receive a xenon or mercury arc lamp mounted in a replaceable housing. The projector further includes a self-contained lamp power supply.

The inventive replaceable lamp housing is adapted to be attached to the projector case and includes a face plate with a central opening therein. Suitable mounting brackets affixed to the face plate hold a xenon or other halogen arc bulb so that when the housing is attached to the projector, the arc and the opening are aligned along the projector optical axis. A back plate, including a concave mirror, is attached to the face plate in spaced apart relationship therewith. The back plate may be angularly adjusted with respect to the face plate to position the mirror so that light from the bulb is reflected along the optical axis.

The invention further comprises a compact power supply for the arc lamp, including a very high voltage RF pulse source for starting the lamp and a low voltage, high current DC supply for maintaining the lamp in its lit condition. The RF ignition source comprises a transformer and spark gap pulse generator, while the low voltage source includes a solid state, full wave, filtered DC supply and comprises circuitry to compensate for current surges associated with starting the lamp.

It is thus a primary object of the present invention to provide a novel self-contained, high intensity light source for a projector.

Another object of this invention is to provide a halogen arc lamp housing and a self-contained power supply for use in a projector.

Yet another object of this invention is to provide a replaceable lamp housing for a projector, the housing including mounting brackets for a xenon or other halogen lamp.

It is a further object of this invention to provide a projector which includes a xenon arc lamp mounted in a replaceable housing, and which further includes a self-contained power supply for the lamp.

A further object of the invention is to provide a compact power supply for a xenon lamp, including both a high voltage starting source and a low voltage, high current DC sustaining source.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIGURE 1 is a side elevational view, in partial section, of a preferred embodiment of the inventive projector light source, including a xenon arc lamp mounted in a replaceable housing, and a lamp power supply contained within the projector case. A screen, on which 35 millimeter slides may be projected using the invention, also is shown;

FIGURE 2 is a top view of the projector illustrated in FIGURE 1; a cut-away section shows the location of various power supply components within the projector;

FIGURE 3 is a perspective view of a preferred embodiment of the inventive replaceable halogen arc lamp housing. The housing is shown attached to the projector of FIGURE 1 by means of the mounting plate illustrated in FIGURE 6;

FIGURE 4 is a rear elevational view of the lamp housing shown in FIGURE 3;

FIGURE 5 is a top plan view, in partial section, of the lamp housing shown in FIGURE 3;

FIGURE 6 is a fragmentary front elevational view taken along the line 6—6 of FIGURE 1 showing the projector mounting plate for the replaceable lamp housing; and FIGURE 7 is an electrical schematic diagram of the inventive halogen arc lamp power supply, as included in the projector of FIGURE 1.

DESCRIPTION OF THE PREFERRED EMBODIMENT

Referring to FIGURES 1 and 2, there is shown a 35 millimeter slide projector 10 of the type utilizing a circular slide tray 11. In accordance with the present invention, projector 10 is equipped with a high intensity halogen arc bulb mounted within replaceable lamp housing 30. Projector 10 also is provided with a self-contained power supply for the halogen lamp, including a starter power supply 50 (various components of which are shown at 50'), and a DC power supply 70 (components of which are indicated generally at 70' in FIGURE 1).

Projector 10 is supplied with 110 volt AC power via line cord 13 and plug 14; this power provides an input to starting circuit 50 and DC supply circuit 70, as well as to the mechanism (not shown) for positioning slide tray 11. When tray 11 is positioned to a desired location, typical 35 millimeter slide 15 is lowered from slot 12 in tray 11 into receptacle 16. Slide 15 is illuminated by light from lamp 60 within housing 30, both directly via lens 17 and after reflection from mirror 18. By use of a conventional lens system, comprising condenser lens pairs 19 and 19', and objective lens 20, an image of slide 15 is projected on screen 21. Focusing is accomplished by positioning lens housing 22 (containing lenses 19' and 20) transversely of case 23 of projector 10. It will be appreciated that a very bright image of slide 15 is produced on screen 21 owing to use of high intensity halogen arc lamp 60.

Forced air cooling for lamp 60 and lamp housing 30 may be provided by a blower and air filter mounted in the region 24 shown in phantom in FIGURE 1. Forced air preferably is directed upward from the bottom of lamp housing 30, over lamp 60, and out of case 23 via louvers (indicated at 23') directly above housing 30.

Lamp housing 30 is replaceably attached to case 23 of projector by means of mounting plate 25.

Various details of lamp housing 30 are illustrated in FIGURES 3, 4 and 5. In particular, note that housing 30 comprises a face plate 31 having longitudinal side portions 32 substantially perpendicular to, and equal in length therewith. Fixedly attached to each of side portions 32 is a planar guide plate 33. Each plate is attached to a side portion 32 by means of bolts 34 which pass through side portion 32, spacer 35, and guide plate 33. Bolt 34 is fastened using nut 36.

Face plate 31 contains a central opening through which light from lamp 60 may emerge. As illustrated in FIGURES 1 and 5, lens 17 (or, alternatively, a protective covering of glass or quartz) is provided across the opening in face plate 31 to protect lamp 60 and to focus the light therefrom.

Halogen arc lamp 60 is attached to face plate 31 by means of upper substantially C-shaped bracket 37 and lower bracket 41. Upper bracket 37 includes extensions 37' or lens 17. Bracket 37 is fastened to face plate 31 by spot welding tabs 37" thereto. A central portion 38 of bracket 37 is semicircular, with a diameter slightly larger than that of one tubular extension 61' (normally the anode end) of lamp 60. Fastener 39, a portion of which also is semicircular, is attached to bracket 37 by means of screws 40 to retain lamp 60. An insulating layer, typically of asbestos, may be used between lamp extension 61' and bracket 37 or fastener 39 to restrict heat transfer to bracket 37 and to serve as a cushion for the lamp. Lower bracket 41 and fastener 42 (connected thereto by screws 43) may be of similar construction to that of upper bracket 37 and fastener 39 respectively. Another screw 44 is provided through fastener 42 to tighteningly engage the cathode end 62' of lamp 60 to prevent the lamp from slipping downward.

Electrical connections to lamp 60 are made via connectors 83 and 84, either or both of which may have radial heat radiating fins. Wires 85 and 86 respectively provide electrical conduction between power supplies 50 and 70 (see FIGURE 7) and connectors 83 and 84.

Back plate 45, as shown in FIGURES 3, 4 and 5, also is substantially U-shaped, and includes longitudinal sides 46 substantially perpendicular to, and equal in length therewith. Each side 46 is inserted between guide plate 33 and side portions 32, appropriate separation being insured by making the thickness of spacer 36 greater than that of side 46. Each of sides 46 is provided with a pair of threaded posts 47 extending outwardly thereof. Threaded posts 47 extend through a corresponding pair of slots 48 provided in each of side portions 32 and are terminated by capped nuts 49.

As shown most clearly in FIGURES 3 and 4, the overall length of back plate 45 is less than that of guide plates 33 which in turn are shorter than side portions 32. Bolts 34 are spaced apart longitudinally of side portions 32 at a distance greater than the length of back plate 45. This arrangement allows the angular orientation between face plate 31 and back plate 45 to be adjusted, while maintaining the relative longitudinal positions thereof.

As detailed in FIGURES 3 and 5, this adjustment is accomplished by four flanger screws 26 and 26' which engage threaded holes through boss regions 31' on face plate 31. The neck of each screw 26, between head and flange 126, is of a diameter slightly smaller than the corresponding hole through back plate 45, thereby allowing screw 26 to rotate freely therein. Flange 126 may be held in position by retaining nut 27.

Replaceable lamp housing 30 may be assembled in the following manner. First, sides 46 of back plate 45 are flexed together sufficiently to allow posts 47 to be inserted through slots 48, after which capped nuts 49 are attached. Guides 33 then are inserted down between sides 46 and side portions 32, and screw 34, spacer 35 and nut 36 appropriately installed. Each of screws 26 and 26' is inserted through back plate 45, and flange 126, and retaining nut 27 threaded into place thereon. Screws 26 then are threaded into boss regions 31'.

Referring to FIGURES 3 and 4, is it seen that back plate 45 is provided with a mirror 18 of appropriate hemispherical or parabolic curvature. Mirror 18 covers a large circular opening centrally located in back plate 45, and is attached thereto by means of clips 28. Each of clips 28 includes fingers 28' which engage a peripheral portion of mirror 18. Clips 28 are attached to back plate 45 by screws 29 which engage corresponding threaded holes therein.

Lamp housing 30 is attached to case 23 of projector 10 by means of mounting plate 25, as best shown in FIGURES 3, 5 and 6. Plate 25, which preferably is of a thickness somewhat greater than that of case 23, is rigidly attached thereto by screws 68. Screws 69, of a substantially greater diameter than screws 68, threadingly engage through holes in plate 25 and extend therebeyond into the interior of projector 10. Screws 68 may be screwdriver adjusted through clearance holes 67 which extend through case 22 and partway into plate 25, as shown in FIGURE 5. The rear end 69' of each of screws 69 is adapted to matingly, disconnectingly engage face plate 31 of lamp housing 30, as shown generally in FIGURES 3, 4, and 5. For example, ends 69' could terminate in a short rod-like region having a circumferential ring therein. This rod and ring then may engage an appropriate spring-loaded coupling mounted to face plate 31. Alternatively, face plate 31 may be provided with vertical slits, the lower ends of which have a diameter sufficient to allow insertion of the rod-like end 69' of screw 69, the remainder of the slit having a narrower width just sufficient to be received by the groove in end 69'.

Replaceable housing 30 may be installed in projector 10 through an appropriate opening in case 22. For example, the louvered region 23' of case 23 (above lamp housing 30 as evident in FIGURE 1) may be of a hinged or removable design to provide opening 23'' evident in FIGURE 3. Alternatively, all or part of the rear of projector 10 may be removable to allow replacement of lamp housing 30. Since xenon arc lamps typically have useful lifetimes on the order of 1500 hours, the lamp will not have to be replaced often, hence the slight inconvenience of removing a panel to replace housing 30 can be tolerated.

When installed, the orientation of housing 30 can be adjusted to correctly position mirror 18. Since the position of lamp 60 is preadjusted with respect to lens 17 on front plate 31, when housing 30 is mounted in projector 10 lamp 60 will be at the correct height and lateral position to provide maximum light along the optical axis of projector 10 (see FIGURE 1). However, mirror 18 may require adjustment to reflect light along the optical axis. Screws 69a and 69b are used to accomplish adjustment of housing 30, and hence mirror 18, about a vertical axis; note that these screws are located on opposite sides of a vertical axis through the center of face plate 31. Thus by threading one of screws 69a and 69b in and the other out, the desired angular orientation of housing 30, and hence of mirror 18, may be achieved.

Adjustment of mirror 18 about a horizontal axis is accomplished by threading the top screws 26 in toward face plate 31 and the bottom screws 26' out, or vice versa. This in effect varies the angular orientation of back plate 45 with respect to face plate 31. Note that vertical motion of plate 45 is prevented by threaded posts 49 which are constrained to horizontal motion in slots 48. This ensures that when mirror 18 is adjusted about a horizontal axis, the center of the mirror will remain essentially along the optical axis of the projector 10.

Referring now to FIGURE 7, there is shown an electrical schematic diagram of a novel power source for xenon arc lamp 60. The source includes both a high voltage RF starter power supply 50 and a low voltage, high current DC power supply 70 for maintaining lamp 60 in the lit condition. Both sources 50 and 70 are supplied by ordinary household power, e.g., 110 volt AC, fed via line cord 13 (see FIGURE 1) to terminals 63 and 63'. The power supply is controlled by switch 64 and is provided with fuse 65 for overload protection, and lamp 66 to indicate that the supply is ON.

As shown in FIGURE 7, starter power supply 50 includes transformer 52 which steps up the supply voltage (connected via momentary switch 51) to a value on the order of several kilovolts. This voltage from the secondary of transformer 52 charges capacitors 53 and 54, each of which has a breakdown voltage somewhat larger than the output of transformer 52 and may have a capacitance on the order of about .01 to .02 microfarad.

Spark gap 55 is adjusted so that its breakdown voltage is slightly lower than the peak output voltage of transformer 52. Thus when switch 51 is closed, the voltage across capacitors will follow the output voltage of transformer 52 until a voltage sufficiently large to break down spark gap 55 is reached. Capacitors 53 and 54 then effectively will be connected in across primary winding 57 of transformer 56. This will result in an oscillatory primary current in transformer 56 the frequency of which is in the RF range.

Transformer 56 has a turn ratio sufficiently great so that the RF voltage induced in secondary winding 58 will exceed the starting pulse voltage required to ignite lamp 60. Typically, this starting voltage is on the order of 30 kilovolts. One end of secondary winding 58 is connected directly to anode 61 of lamp 60, while the other end of winding 58 is connected to cathode 62 of lamp 60 via RF bypass capacitor 59. The capacitance of bypass capacitor 59 is not critical but typically is on the order of .01 to .1 microfarad, with a breakdown voltage of 500 volts or more.

As indicated in FIGURE 2, transformer 52 may be mounted within projector 10 to the base of case 23. The other components for starter supply 50 may be mounted within the housing designated 50' in FIGURES 1 and 2.

Current to maintain lamp 60 in its ignited condition is provided by DC power supply 70. As indicated in FIGURE 7, supply 70 includes transformer 71 which steps the input voltage down to the appropriate lamp operating voltage, typically on the order of 20 volts. Transformer 71 has a center tapped secondary, the ends of which are connected to the cathodes of diodes 73 and 74. Voltage filtering is provided by parallel connected capacitors 75, 76, and 77, each of which typically may have a capacitance of 2500 microfarads and a breakdown voltage higher than the voltage supplied from transformer 71.

Zener diode 79 is provided to maintain the output voltage at the appropriate voltage to operate lamp 60. That is, the breakdown voltage of Zener diode 79 corresponds approximately to the sustaining voltage required for lamp 60. Capacitor 78 is provided to reduce transients associated with the breakdown of Zener diode 79. Reactor 73 is provided to filter the current surge which occurs when lamp 60 first is ignited.

Resistor 80 functions to limit the current fed to lamp 60. In the embodiment illustrated, resistor 80 comprises ten individual resistors 81, each of which may have e.g., a power dissipation of 50 watts and a resistance of 10 ohms. The total resistance of resistor 80 is 1 ohm, that is, one-tenth the resistance of individual resistor 81. The power dissipation of resistor 80, however, will be ten times that of an individual resistor 81, hence will be on the order of 500 watts.

Since resistors 81, each with an individual power dissipation of e.g., 50 watts, are quite small, a bank of ten such resistors easily can be mounted within projector 10, for example, in region 82 indicated in phantom in FIGURE 1. When so mounted, the heat dissipated by the resistors can escape via louvers on the rear of projector 10. Air from blower 24 may be directed over the resistor bank if additional cooling is required.

Current from low voltage DC power supply 70 is fed to lamp 60 in series with secondary winding 58 of transformer 56. The DC resistance of winding 58 is so low that resistive losses therein are negligible.

Transformer 71 is mounted on the floor of projector 10, as illustrated in FIGURE 2, while filter capacitors 75, 76, and 77, and the various other components of supply 70 (except resistor 80, as noted hereinabove) are mounted in the housing indicated generally at 70' in FIGURE 1.

To start lamp 60, switch 64 is closed. At first, essentially no current is drawn from low voltage supply 70, since before ignition lamp 60 appears as an open circuit. To start the xenon lamp, momentary switch 51 is depressed, causing an RF starting pulse on the order of 30 kilovolts to appear across anode 61 and cathode 62 of lamp 60. Since this voltage, fed by starter power supply 50, exceeds the breakdown threshold value of lamp 60, ionization of the xenon gas within the lamp 60 begins, and current is drawn from low voltage DC supply 70. During the first few milliseconds after ionization, xenon lamps typically are unstable and may draw considerably more current than later required to sustain their operation. The inductive reactance of choke coil 72, in series with the primary of transformer 71, acts to reduce the current pulse reflected back to the AC line during ignition of lamp 60.

Within the first few milliseconds after ignition, a cathode spot, characteristic of field emission, is formed within xenon lamp 60. Once this occurs, the operation stabilizes, and lamp 60 is maintained in the lit condition by current (typically on the order of 25 amperes) from low voltage DC power supply 70. Momentary switch 51 then can be released, turning off starter power supply 50. Note that supply 70 is a current source which will compensate for the nonlinear resistance characteristics typical of xenon lamps after ionization.

To turn off lamp 60, switch 64 is opened, deactivating supply 70.

While the power supply of FIGURE 7 is designed for a xenon lamp having two electrodes, minor modifications within the capability of one skilled in the power supply art will enable it to be used with other types of lamps. For example, should a xenon lamp having a separate starter electrode be used, the output of RF starter power supply 50 could be connected directly between the starter electrode and the cathode of the lamp. The output of current supply 70 is then connected directly between the anode and cathode of the lamp, rather than via the secondary winding of transformer 58.

Similarly, the power supply of FIGURE 7 may be adapted for use with mercury arc lamps. Generally, mercury arc lamps require a higher starting voltage (typically on the order of 10 kilovolts) than do xenon lamps. Also, mercury arc lamps generally use a higher DC sustaining voltage, but a lower current, than do xenon lamps of the same wattage. For example, a mercury arc lamp of 500 watt rating may draw a sustaining current of about 6.8 amperes at 75 volts as compared with a 500 watt xenon lamp which (as noted earlier) typically will use 25 amperes at 20 volts.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. An apparatus facilitating use of a gaseous arc lamp with a projector of the type described, said apparatus comprising:
   a lamp housing including bracket means for mounting a gaseous arc lamp therein;
   said housing comprises:
   a face plate having a central opening therein;
   bracket means attached to said face plate for fixedly retaining said lamp with its arc region adjacent said opening; and
   a back plate attached in spaced apart relationship to said face plate, the distance between said face plate and said back plate being sufficient to permit said lamp to be mounted herebetween;
   means for adjustably attaching said housing to said projector so that the arc of said lamp is in the optical path of said projector; and
   power supply means adapted for mounting within said projector for igniting said lamp and for maintaining it lit.

2. The apparatus defined in claim 1 wherein said face plate includes side portions extending perpendicularly from the longitudinal edges thereof, wherein said back plate includes sides extending perpendicularly from the longitudinal edges thereof, and further comprising:
   means for attaching said sides and said side portions to allow relative lateral motion between said face plate and said back plate.

3. The apparatus defined in claim 2 wherein said back plate includes a mirror fixed thereto opposite said opening, said mirror being positionable to reflect light from said arc through said opening.

4. The apparatus defined in claim 3 further comprising: means for adjusting the relative angular orientation of said face plate and said back plate, comprising a plurality of flanged screws connecting said face plate and said back plate.

5. The apparatus defined in claim 3 wherein said means for adjustably attaching comprises:
   means for adjusting the orientation of said housing about an axis longitudinal thereof.

6. The apparatus as defined in claim 3 wherein said means for adjustably attaching comprises:
   a plate attached in a vertical plane to the case of said projector rearwardly of its optics; and
   screw means threadingly engaging holes in said plate and adapted to receive corresponding hooking members of said face plate.

7. The apparatus as defined in claim 5, adapted for use with a xenon arc lamp, wherein said power supply means comprises:
   a spark gap transformer power supply for providing an RF pulse of sufficient voltage to ignite said lamp; and
   a low voltage supply for providing sufficient direct current to maintain said lamp lit.

8. The apparatus defined in claim 7 wherein said RF supply comprises:
   a first transformer for raising an AC supply voltage to a secondary voltage on the order of several thousand volts;
   capacitor means connected to be charged by said secondary voltage;
   a second transformer having a primary to secondary turns ratio corresponding to the ratio of said secondary voltage to the ignition voltage of said lamp;
   a spark gap having a breakdown voltage lower than the maximum value of said secondary voltage, said spark gap and said primary being connected in series across said capacitor means; and
   means for connecting the output of said secondary across the ignition electrodes of said lamp.

9
9. The apparatus defined in claim 8 wherein said low voltage supply comprises:
first means, comprising a transformer and diode means adapted to rectify the output of said transformer, for converting said AC supply voltage to a DC voltage sufficient to maintain said lamp lit;
filter means comprising at least one capacitor connected to be charged by said DC voltage;
current limiting means comprising a low resistance, high power dissipation resistor, series connecting said DC voltage to said lamp; and
inductor means, in series with the primary of said transformer for limiting current surges in said AC source when said lamp is ignited.

10. The apparatus defined in claim 9 wherein said current limiting means, the secondary of said second transformer, and said lamp are connected in series across the DC output of said first means, and further comprising:
Zener diode means across said DC output, said diode having a breakdown voltage corresponding to the sustaining voltage of said lamp.

11. The apparatus as defined in claim 10 wherein said current limiting means comprises a number $n$ of resistors, each having $n$ times the desired resistance, and $1/n$ times the desired power dissipation of said resistance, said $n$ resistors being connected in parallel; and,
means for mounting said resistors in a ventilated location within the case of said projector.

12. An apparatus facilitating use of a xenon arc lamp with a projector of the type described, said apparatus comprising:
power supply means adapted for mounting within the case of said projector for igniting said lamp and for maintaining said lamp lit;
a replaceable lamp housing, said lamp housing comprising:
a face plate having an opening therein to allow light to emerge therethrough, said face plate having a substantially U-shaped cross section, the side portions of said face plate having a plurality of substantially transverse slots therein, said slots being spaced apart longitudinally;
a back plate, said back plate having a substantially U-shaped cross section of different width than said face plate, said back plate having a corresponding plurality of posts extending substantially perpendicular to the sides thereof, said posts being longitudinally spaced apart at distances corresponding to the spacing between said slots, said back plate being disposed opposite said face plate, with said posts extending through said slots;
upper and lower bracket means extending inwardly from one of said face plate or said back plate, said bracket means being adapted to hold said lamp between and spaced apart from said face plate and said back plate, with the arc region of said lamp adjacent said opening;
mirror means disposed on said back plate for reflecting light from said arc region of said lamp through said opening in said face plate; and
means for adjustably attaching said housing to said projector so that the arc of said lamp is in the optical path of said projector.

13. The apparatus defined in claim 12 further comprising:
means for adjusting the position of said posts transversely of said slots, thereby adjusting the relative angular orientation of said back plate and said face plate without changing the relative longitudinal positions thereof.

14. The apparatus as defined in claim 12, adapted for use with a xenon arc lamp, wherein said power supply means comprises:
a spark gap transformer power supply for providing an RF pulse of sufficient voltage to ignite said lamp; and
a low voltage supply for providing sufficient direct current to maintain said lamp lit.

15. The apparatus defined in claim 14 wherein said RF supply comprises:
a first transformer for raising an AC supply voltage to a secondary voltage on the order of several thousand volts;
capacitor means connected to be charged by said secondary voltage;
a second transformer having a primary to secondary turns ratio corresponding to the ratio of said secondary voltage to the ignition voltage of said lamp;
a spark gap having a breakdown voltage lower than the maximum value of said secondary voltage, said spark gap and said primary being connected in series across said capacitor means; and
means for connecting the output of said secondary across the ignition electrodes of said lamp.

16. The apparatus defined in claim 15 wherein said low voltage supply comprises:
first means, comprising a transformer and diode means adapted to rectify the output of said transformer, for converting said AC supply voltage to a DC voltage sufficient to maintain said lamp lit;
filter means comprising at least one capacitor connected to be charged by said DC voltage;
current limiting means comprising a low resistance, high power dissipation resistor, series connecting said DC voltage to said lamp; and
inductor means, in series with the primary of said transformer for limiting current surges in said AC source when said lamp is ignited.

17. The apparatus defined in claim 16 wherein said current limiting means, the secondary of said second transformer, and said lamp are connected in series across the DC output of said first means, and further comprising:
Zener diode means across said DC output, said diode having a breakdown voltage corresponding to the sustaining voltage of said lamp.

18. The apparatus as defined in claim 17 wherein said current limiting means comprises a number of $n$ resistors, each having $n$ times the desired resistance, and $1/n$ times the desired power dissipation of said resistance, said $n$ resistors being connected in parallel; and,
means for mounting said resistors in a ventilated location within the case of said projector.

References Cited

UNITED STATES PATENTS 3,173,617   3/1965   Gotze _____ 240—44 X

JOHN W. HUCKERT, Primary Examiner

R. F. POLISSACK, Assistant Examiner

U.S. Cl. X.R.

240—11.4, 41.3, 44, 44.1, 44.2; 315—241; 353—119